Feb. 4, 1936.  J. R. McCURDY  2,030,015
APPARATUS FOR FORMING AND SURVEYING EARTH CORES
Filed Feb. 16, 1935  4 Sheets-Sheet 1
Fig.1.
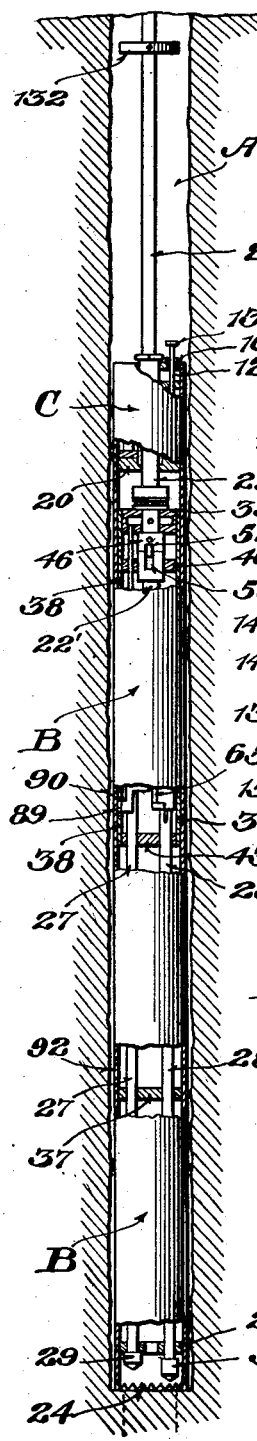
Fig.15.
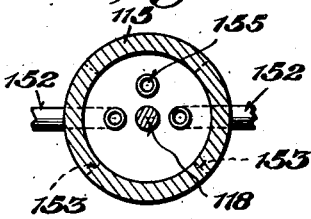
Fig.16.
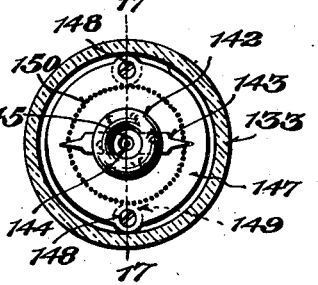
Fig.17.
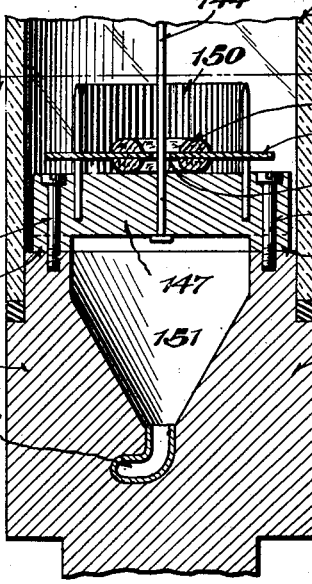
Fig.18.
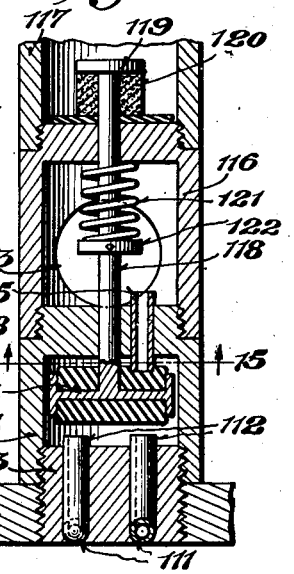
Fig.19. Fig.20. Fig.21.
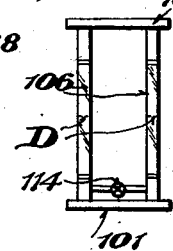 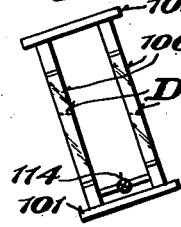 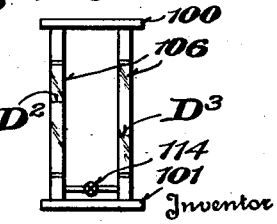
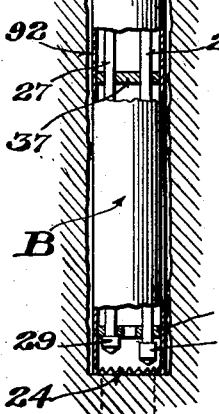
Inventor
John R. McCurdy,
By Edward Pickard
his Attorneys Feb. 4, 1936.   J. R. McCURDY   2,030,015
APPARATUS FOR FORMING AND SURVEYING EARTH CORES
Filed Feb. 16, 1935   4 Sheets-Sheet 2
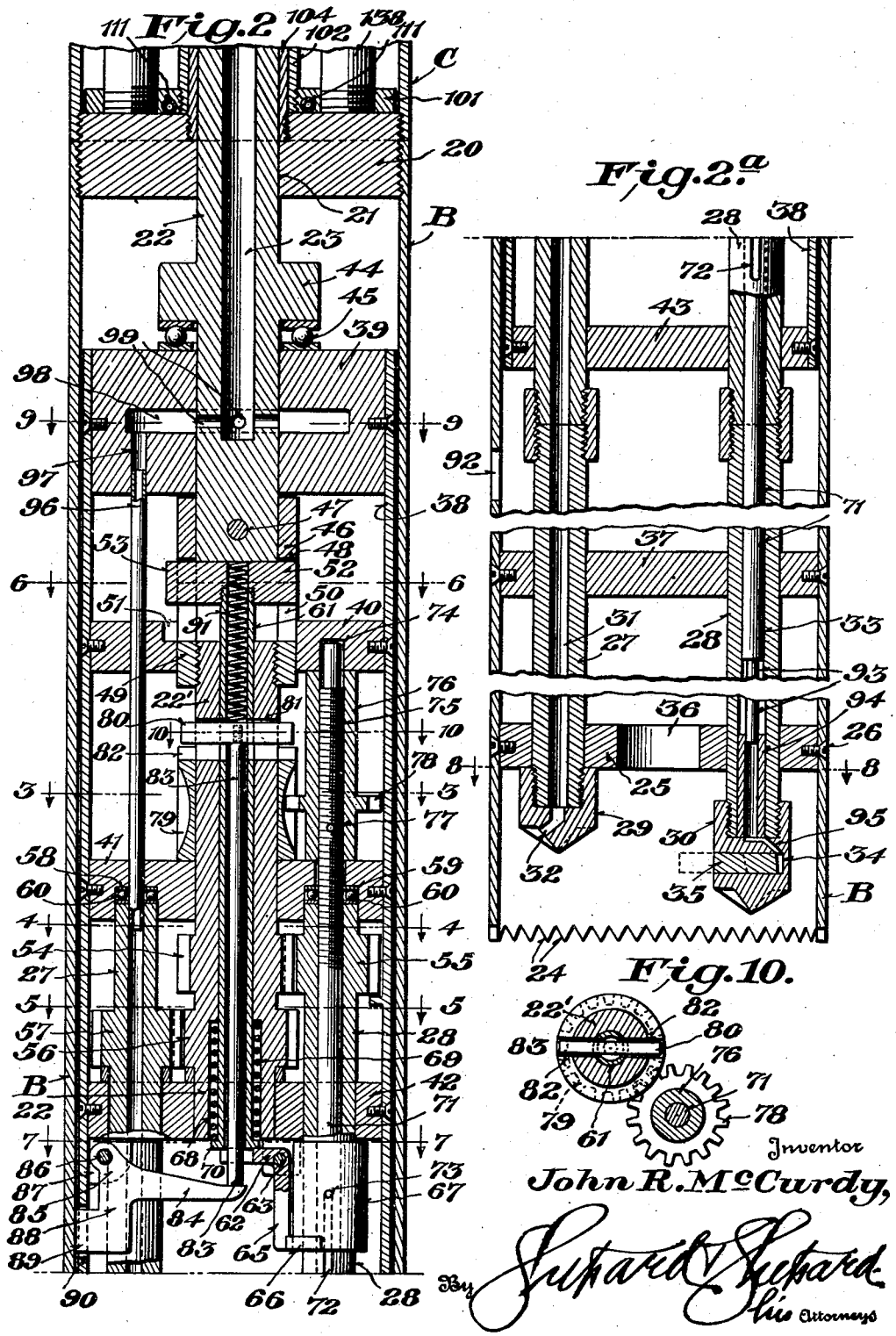
Inventor
John R. McCurdy,
By Richard & Richard
His Attorneys

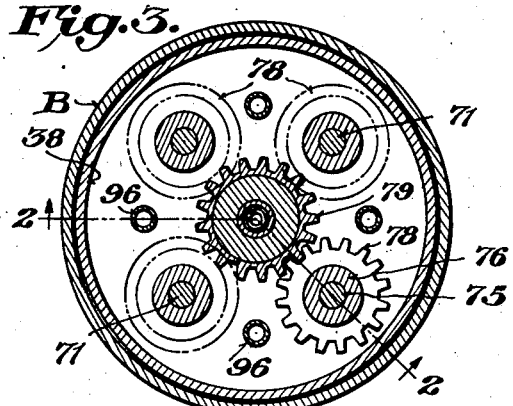
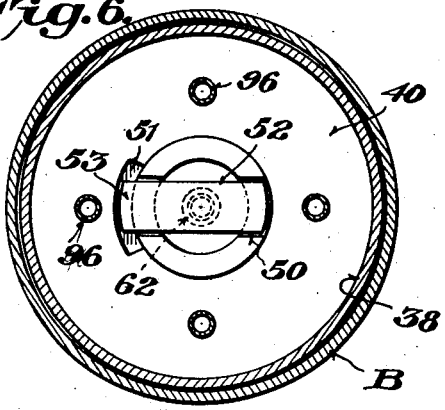
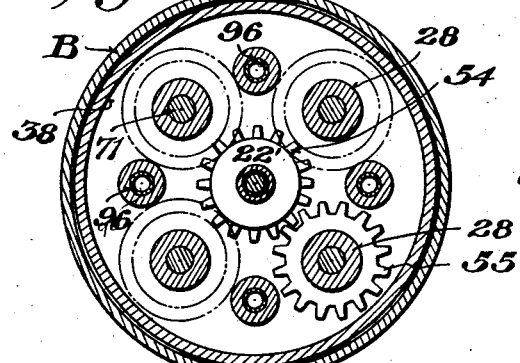
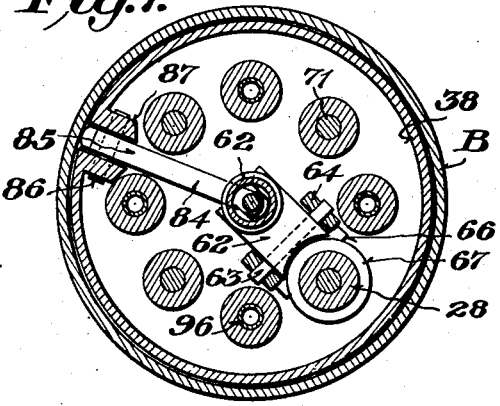
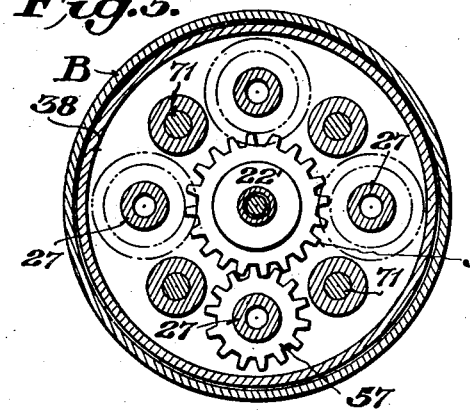
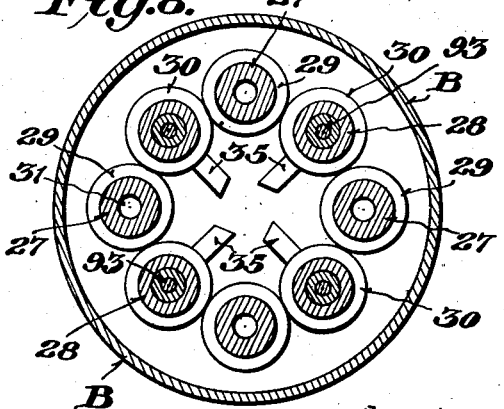
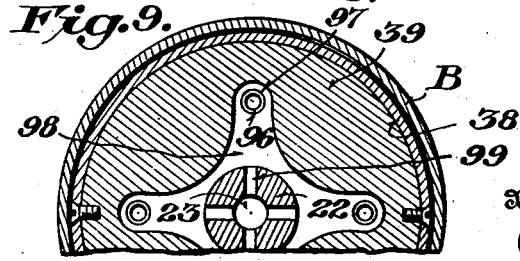

Feb. 4, 1936.  J. R. McCURDY  2,030,015
APPARATUS FOR FORMING AND SURVEYING EARTH CORES
Filed Feb. 16, 1935   4 Sheets-Sheet 4
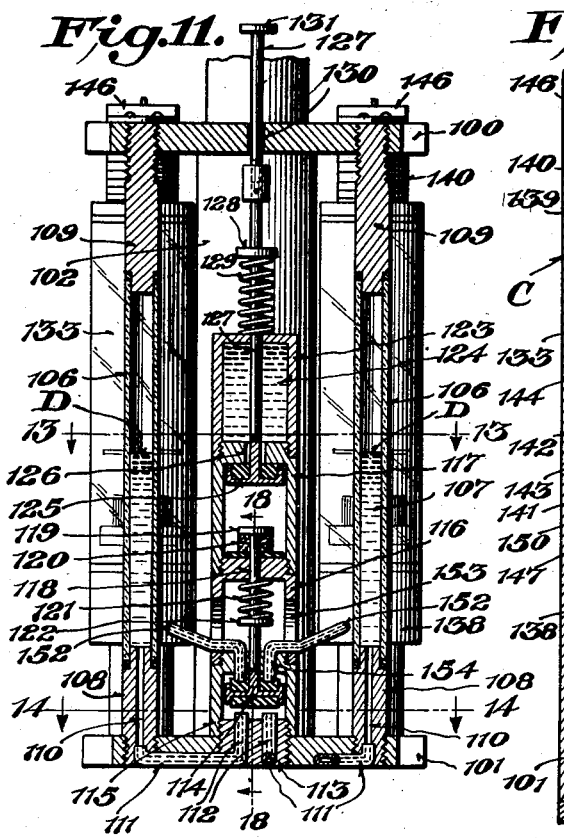
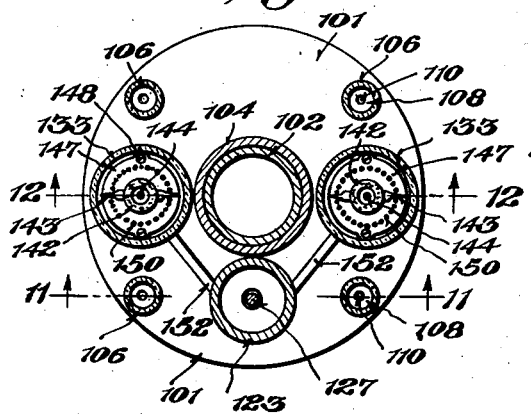
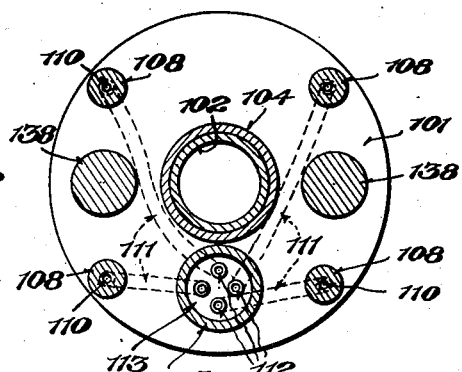
Inventor
John R. McCurdy,
By *[signature]*
his Attorneys Patented Feb. 4, 1936

2,030,015

UNITED STATES PATENT OFFICE 2,030,015

APPARATUS FOR FORMING AND SURVEYING EARTH CORES

John R. McCurdy, Virginia, Minn.

Application February 16, 1935, Serial No. 6,914

19 Claims. (Cl. 255—72)

This invention relates to the obtaining of earth cores and the surveying of such cores as well as the surveying of holes drilled or bored in the earth, and it is an important object of the invention to provide for the accurate indicating of the dip and strike of the geological formation at the bottom of the hole and also the dip and strike of the hole at any elevation thereof.

The present invention employs a compass for indicating the strike, and for indicating the dip there is employed a mobile liquid, such for instance as water, and it is another important object of the present invention to provide for the automatic locking of the compass needle in the indicating position it assumes while forming an earth core at the bottom of the hole, and at any selected elevation within the hole, and for automatically controlling the indicating liquid so that it may be employed for definitely and accurately indicating the dip or angular relation to the horizontal of the instrument while forming a core at the bottom of the hole, and at any elevation within the hole.

Further objects of the invention are to provide for the production of a core of earth material at the bottom of a hole in the earth; to effect the convenient elevation of the core to the earth's surface; and to maintain the core in its original position with respect to the dip and strike indicating means when the core is being brought to the earth's surface.

A further important object of the invention is to produce the core by a drilling operation, and also to provide for undercutting the core in a very simple and effective manner, so that the core may be broken away from the earth by the operation of elevating the apparatus without in any manner disrupting the core or changing its angular position within the apparatus.

In the drawings:

Figure 1 is a conventional vertical sectional view of the bottom portion of a hole drilled in the earth and showing, in elevation, the apparatus of the present invention located at the bottom of the hole in position for operation, parts of the casing being broken away to show certain interior parts of the apparatus;

Fig. 2 is an enlarged sectional view of the lower portion of the surveying apparatus of the present invention taken on the line 2—2 of Figure 3;

Figure 2a is a vertical sectional view taken on the same line as Figure 2 and is a bottom continuation of the latter;

Figure 3 is a cross-sectional view on the line 3—3 of Figure 2;

Figure 4 is a cross-sectional view on the line 4—4 of Figure 2;

Figure 5 is a cross-sectional view on the line 5—5 of Figure 2;

Figure 6 is a cross-sectional view on the line 6—6 of Figure 2;

Figure 7 is a cross-sectional view on the line 7—7 of Figure 2;

Figure 8 is a cross-sectional view on the line 8—8 of Figure 2a;

Figure 9 is a cross-sectional view on the line 9—9 of Figure 2;

Figure 10 is a detail cross-sectional view on line 10—10 of Figure 2;

Figure 11 is a view of the dip and strike indicating mechanism and is a sectional elevation taken on the line 11—11 of Figure 13;

Figure 12 is an enlarged sectional view taken on the line 12—12 of Figure 13;

Figure 13 is a cross sectional view taken on the line 13—13 of Figure 11;

Figure 14 is a cross sectional view on the line 14—14 of Figure 11;

Figure 15 is a cross sectional view on the line 15—15 of Figure 18;

Figure 16 is a cross sectional view on the line 16—16 of Figure 17 and on a reduced scale;

Figure 17 is an enlarged detail vertical cross sectional view on the line 17—17 of Figure 16;

Figure 18 is an enlarged detail sectional view taken on the line 18—18 of Figure 11;

Figures 19, 20 and 21 are diagrammatic views showing the manner of using the dip indicating mechanism of the present apparatus.

In Figure 1 of the drawings there has been shown in a conventional manner the lower portion of a hole A drilled or bored in the earth, and in this hole has been shown the apparatus of the present invention which includes boring mechanism contained in the lower cylindrical casing B, and dip and strike indicating mechanism contained in the upper cylindrical casing C, the two casings being of the same diameter and detachably connected in any suitable manner, such for instance as indicated at the top of Figure 2 of the drawings wherein 20 designates a cylindrical head or partition which is externally screw threaded, and to which the interiorly screw threaded adjacent ends of the casings B and C are connected. The head 20 is provided with a central opening 21 through which extends a conventional drill rod 22 having the conventional central longitudinal bore 23 for the introduction of wash water into the bottom of the hole during the boring operation. The bottom of the casing B is open, as shown in Figures 1 and 2a, and may be provided with sharp teeth or projections 24 to rest upon and sink into the bottom of the drill hole A in order to prevent rotative creeping of the casing under the rotary influence of the drill shaft 22 and parts connected with and driven thereby. Of course, any other suitable or preferred means may be provided to prevent rotation of the casing B within the drill hole. Disposed within the lower portion of the casing B is a horizontal bottom plate or partition 25 which is rigidly held within the casing in any suitable manner as by screw threaded fastenings 26. Two sets of drill spindles designated 27 and 28 respectively extend through suitable openings in the bottom plate or partition 25, there being eight such drill rods as well shown in Figure 8, divided into two groups of four each, one group being designated 27, and the other group being designated 28. These drill spindles are arranged in a circle, and the drill spindles 27 are provided at their lower ends with drill heads 29 of any suitable or conventional form while each of the other set of drill spindles 28 is provided at its lower end with a suitable drill head 30. Each of the drill spindles 27 is provided with a longitudinal bore 31 for conducting water downwardly to the drill head 29, which, as best shown in Figure 2a, is provided with an outlet water passage 32 communicating with the bottom end of the bore 31. Water is not supplied to the drill spindles 28, but each of these drill spindles is provided with a longitudinal bore 33 for a purpose as will be hereinafter explained. Each of the drill heads 30 is longer and projects below each of the drill heads 29 and is provided with a chamber 34 opening through one of the upright sides of the drill head 30 and contains an undercutter bit 35 which normally lies within the periphery of the drill head but is capable of being projected outwardly, as indicated in dotted lines, for the purpose of undercutting the core which is to be provided by this apparatus in the manner as will be hereinafter described. It will of course be understood that the undercutter 35 is disposed in a plane below the bottom of that of the drill heads 29 so as not to interfere with the latter during the undercutting operation. It will also be explained when the undercutting operation is being performed the drill heads 30 will have been fed down below the bottom of the casing B and so the latter will not be in the horizontal circular path of the undercutters. By reference to Figure 8 of the drawings it will be seen that the drill spindles are arranged so that the periphery of adjacent drill heads 29 and 30 come into very close relation and that as the drills sink into the earth and produce eight holes therein, the walls separating adjacent holes will be very thin and probably disintegrate and fall apart leaving a plug of earth material within the central space bounded by the drills and with the undercutters 35 underlying the bottom of the plug and constituting supports for the plug when the apparatus is being drawn upwardly out of the drill hole A. The plug of earth material produced by the holes formed by the drills will have its exterior fluted or corrugated longitudinally with the outer edges of the flutes or corrugations lying between adjacent drill heads, whereby rotatable creeping of the plug of earth material on its axis will be prevented during the drilling and lifting of the apparatus out of the drill hole A, and thus maintaining the plug in its original position with respect to the apparatus for purposes as will be hereinafter explained.

The borings or cuttings produced by the drill heads are washed upwardly through an opening 36 provided in the lower head 25 and into a closed compartment defined by the casing B, the lower head 25 and another partition 37 suitably secured within the casing B at a proper distance above the part 25.

The mechanism for transferring motion from the drill rod 22 to the drill spindles 27 and 28 is mounted in a carriage made up of a cylindrical sleeve or barrel 38 mounted to slide endwise within the casing B and provided with cross-heads or partitions designated, from top to bottom, 39, 40, 41, 42 and 43 respectively. Immediately above the upper cross-head 39, the drill rod 22 is provided with an external annular shoulder 44 and between the shoulder 44 and the cross-head 39 there is an antifriction thrust bearing 45. The drill rod 22 extends downwardly through a central opening in the upper cross-head 39 and terminates short of the cross-head 40, and carries on its lower end a collar 46 rigidly secured thereto in any suitable manner as by means of a pin 47. This collar 46 projects below the bottom end of the drill rod 22 and is provided with a diametric groove 48. Below the drill rod 22 and in alignment therewith is a lower drill rod section 22' which is provided upon its upper end with a fixed collar 49, shown as screw threaded upon the shaft section 22'. The top of the collar 49 lies close to the bottom of the collar 46 and is provided with a deep diametric groove 50. The collar 49 extends through an opening in the partition 40, and in the top of the latter (see Figure 6) there is a socket 51 which intersects one edge of the opening through the partition 40. The collars 46 and 49 constitute clutch members on the respective drill rod sections 22 and 22', and they are adapted to be connected for simultaneous rotation by means of a shiftable clutch member 52 in the form of a cross-head designed to lie in the grooves 48 and 50 and to overlap the joint between the clutch members 46 and 49 so as to connect the rod sections 22 and 22' for simultaneous rotation. The shiftable clutch member 52 may be lowered so as to lie entirely within the seat constituted by the groove 50, thereby to leave the clutch members 46 and 49 unconnected, which will of course break the drive connection between the drill rod 22 and the lower drill rod section 22' whenever it is desired to stop the operation of the drills as will be hereinafter further explained. One end 53 of the shiftable clutch member 52 projects beyond the peripheries of the members 46 and 49 so as to drop into the socket or seat 51 and thus positively hold the lower shaft section 22' against rotation and to maintain it in a predetermined fixed position for a purpose as will hereinafter be explained.

The drill spindles 28 (see Figures 2 and 4) are driven from the lower drill rod section 22' which latter extends downwardly through the partitions 41 and 42. Immediately below the partition 41, a gear 54 is provided upon the shaft section 22' and is constantly in mesh with a driven gear 55 on each of the drill spindles 28. Immediately below the gear 54, a gear 56 is provided upon the drill rod sections 22', and, as shown in Figures 2 and 5 of the drawings, it will be seen that the driving gear 56 is in constant mesh with a driven gear 57 on each of the drill spindles 27. As well shown at the bottom of Figure 2 and at the top of Figure 2a it will be understood that the drill spindles 27 and 28 extend upwardly through the partitions 43 and 42, and their upper ends are received within the respective sockets 58 and 59 in the bottom of the partition 41. A suitable anti-friction thrust bearing 60 is provided for the upper end of each drill spindle.

As thus far described it will be understood that the drill spindles 27 and 28 are in constant driving relation with the lower drill rod section 22' and will always rotate as long as the shiftable clutch member 52 is in the position shown in Figure 2 of the drawings, and that by dropping the shiftable clutch member 52 out of engagement with the clutch member 46, the lower drill rod section 22' will cease to rotate and consequently the drill spindles will also cease to rotate.

It will here be explained that during the drilling operation, there will be a downward feeding of the drill rod 22, which will of course force downwardly the drill carriage and all of the parts mounted thereon so as to sink the drills into the bottom of the hole A in the earth.

The driving clutch between the upper and lower drill rod sections 22 and 22' is maintained in its engaged condition with the shiftable clutch member 52 elevated and held by means of a tubular rod or sleeve 61 depending centrally from the bottom of the shiftable clutch member 52 and extending downwardly through an open ended bore extending entirely through the drill rod section 22'. The lower end of the sleeve or rod 61 projects below the bottom of the drill rod section 22' and is supported upon the horizontal arm 62 of a bell crank lever fulcrumed at 63 between a pair of ears 64, best shown in Figure 7 of the drawings, and depending from the bottom of the partitions 42. The other arm 65 of this bell crank extends downwardly along side of a collar 67 mounted to slide endwise on one of the drill spindles 28, and at the lower end of the arm 65 there is a horizontally disposed fork or yoke 66, the arms of which are spaced apart less than the diameter of the sleeve 67 so as to engage with the exterior of the latter and maintain the bell crank with its arm 62 in a horizontal position. By permitting the arm 65 of the bell crank to swing to the right, the horizontal arm 62 will swing downward, thus lowering the sleeve 61 and in turn lowering the shiftable clutch member 52 out of engagement with the drill rod 22, thus breaking the drive connection between the upper and lower drill rod sections thus stopping the rotation of the drill spindles.

It will of course be understood that the yoke 66 of the bell crank is held in its normal position shown in Figure 2 during the drilling operation, and that the bell crank can be released, so as to lower the shiftable clutch member 52, by moving the sleeve 67 downwardly until its top clears the bottom of the yoke 66, the arms of the yoke 66 being spaced apart far enough to straddle the drill spindle 28 and thereby permit of the necessary swinging movement of the bell crank to lower the tubular rod 61 and the shiftable clutch member 52. To assist the downward movement of the shiftable clutch member 52, a coiled spring 68 is provided around the lower end of the tubular rod 61 and located in a counter bore 69 in the bottom of the drill rod section 22', the upper end of the spring bearing against the closed inner end of the counter bore 69, and the lower end of the spring bearing downwardly upon the top of an annular flange 70 provided on the lower end of the tubular rod 61. Normally the spring 68 is under tension and of course forces the rod downwardly when the supporting arm 62 of the bell crank is lowered.

The means for moving the sleeve 67 downwardly includes an endwise movable rod 71 mounted in a bore in the drill spindle 28 which carries the sleeve 67. The drill spindle is provided as best shown at the bottom of Figure 2, with a longitudinal slot 72, and in this slot slides a pin 73 projecting from the rod 71 and into the sleeve 67 so that the latter may be moved endwise by moving the rod 71. The rod 71 extends upwardly through the open top of the bore in the drill spindle 28, through the center of the thrust bearing 60, through the partition 41 and up to the partition 40, the latter being provided with a socket 74 to receive the upper end of the endwise movable rod 71. The upper portion of the rod 71 is screw threaded as at 75, and on this screw threaded portion of the rod there is a nut 76, the lower end of which engages the top face of the partition 41, and its upper end engages the bottom face of the partition 40, thereby to prevent endwise movement of the nut. A frangible pin 77 temporarily holds the nut fixed to the rod 71. This nut is provided between its ends with gear teeth 78 which mesh with the driving gear 79 which is normally loose upon the drill rod section 22' and which may be clutched to said drill rod section in a manner as will hereinafter appear. Inasmuch as the spindle 28 is positively driven by the driving gear 54 and inasmuch as this drill spindle, the rod 71 and the sleeve 67 are connected together by the pin 73, they will all rotate together. Likewise the nut 76 will rotate with the rod 71 because it is connected thereto by the frangible pin 77. As the gear 79 is loose upon the drill rod section 22' it does not interfere with the rotation of the parts thus described. The gear 79 has one tooth more than the gear 78 on the nut 76, and when the gear 79 is clutched to the drill rod section 22', the gear 78 and consequently the nut 76 will be rotated at a slightly lower rate of speed than the rod 71 which is rotating with the drill spindle 28, the effect being to retard the rotation of the nut 76 which will result in the breaking of the frangible pin 77 so as to permit this different rate of rotation between the nut and the rod and allow the rod to be fed downwardly by the rotation of the nut 76, whereby the sleeve 67 will be moved downwardly until its top end clears the fork 66 resulting in the dropping of the clutch member 52 and the stopping of the rotation of the drill spindles.

The clutch mechanism for the loosely mounted gear 79 includes a shiftable clutch member 80 in the form of a cross-head lying in a diametric slot 81 formed in the drill rod section 22' and extending from a point above the gears 79 downwardly into the top portion of said gear. In the top of the gear there is a diametric groove or seat 82 into which the clutch member 80 may be moved so as to clutch the gear 79 to the drill rod section 22'. Normally the shiftable clutch member 80 is held in its elevated position by means of a stem 83 extending downwardly from the member 80 through the hollow or tubular stem 61 with its lower end projecting downwardly through the open bottom of the part 61 and through the forked portion of the bell crank arm 62. The lower end of the stem 83 is supported upon the horizontal arm 84 of a bell crank 85 which is fulcrumed at 86 between a pair of ears 87 depending from the bottom of the partition 42, as shown in Figures 2 and 7 of the drawings. The depending arm 88 of the bell crank is provided with a laterally extending heel or projection 89 that is normally received in a notch or opening 90 in the adjacent wall of the cylindrical sleeve or barrel 38 whereby the bell crank is held in its normal position so as to support the rod or stem 83 with the shiftable clutch member 80 in an elevated position and out of the seat 82 in the top of the gear 79. It will now be understood that by releasing the bell crank 85 and permitting its horizontal arm 84 to swing downwardly the shiftable clutch member 80 may be permitted to drop into the seat 82 and thereby clutch the gear 79 to the drill rod section 22'. To assist in forcing the clutch member 80 downwardly, there is a helical spring 91 mounted within the tubular stem 7 and bearing at its upper end against the bottom of the drill rod section 22 and at its lower end against the top of the shiftable clutch member 80, whereby the clutch member will be positively moved downwardly when the bell crank arm 84 is lowered. It will, of course, be understood that the heel portion 89 of the bell crank 85 bears against and slides along the inner wall of the casing B so as to normally maintain the bell crank in the position shown in Figures 2 and 7. The outer end of the heel portion 89 is convexed so as to conform to the concaved contour of the inner wall of the casing B so as to insure the free sliding of the heel along the casing. As the drilling operation proceeds and the carriage 38 is being fed downwardly the heel 89 travels along the wall of the casing B until it comes opposite a notch or opening 92, shown in Figure 2a, in the casing B, whereupon, due to the weight of the parts and the pressure of the spring 91, the heel 89 will be moved into the notch or opening 92 and the arm 84 will be lowered, thereby lowering the stem or rod 83 and dropping the shiftable clutch member 80 into the seat in the top of the gear 79, thus clutching the latter to the drill rod section 22' and retarding the rotation of the gear 78 with the result that the rod 71 and the sleeve 67 are moved downwardly for the ultimate purpose of releasing the clutch between the upper and lower drill rod sections and stopping the operation of the drill. As the drill carriage 38 is now locked to the casing B by reason of the part 89 being in the notch or opening 92, the drill carriage 38 cannot be moved downwardly through the casing B.

It will here be explained that only one drill spindle 28 is provided with a sleeve 67 for the control of the bell crank 65, but each drill spindle 28 is provided with a rod 71, and each rod is utilized to control the outward feeding of the undercutter 35 of its drill bit or head 30. The lower end of each rod 71 is reduced in diameter, as at 93, to form a pump plunger working in a pump barrel 94 provided in the lower end portion of the spindle 28. This pump barrel contains a hydraulic element such as grease, oil or the like, capable of being forced downwardly by the action of the pump plunger 93. The open bottom of the pump barrel 94 is in communication with a passage 95 formed in the drill bit 30 and communicating with the inner closed end of the chamber 34 in rear of the undercutter 35, whereby hydraulic pressure may be applied to the rear end of the undercutter for the purpose of feeding it outwardly in order that it may undercut the plug of earth material produced by the boring action of the drill bits 29 and 30. It will of course be understood that the length of each rod 71 is such that the pump is not operating during the downward travel of the drill carriage 38, but comes into operation when the heel portion of the bell crank 85 enters the notch or opening 92 in the casing B and the downward movement of the drill carriage is thereby stopped, whereupon the pumps come into operation and the undercutters 35 are fed outwardly during the continued rotation of the drill spindles so as to undercut the core, the undercutting continuing until the sleeve 67 passes below the fork 66 on the bell crank 65 which releases the bell crank and in turn disconnects the clutch member 52 from the drill rod 22 and stops all further operation of the drill spindles. The drilling mechanism having thus produced a series of vertical drill holes in the bottom of the drill hole A arranged in a circle and in close proximity has also produced a core which lies in the area defined by the drill spindles, as well shown in Figure 8, and this core has been undercut by the undercutters 35 which lie beneath the core when the rotation of the drill spindles has been stopped by the disconnection of the clutch member 52 and constitutes a support underlying the bottom of the core so that the latter may be drawn upwardly through the drill hole A when the apparatus is drawn upwardly by the proper manipulation of the drill rod 22. The drilling operation produces a series of vertical flutes or corrugations in the exterior of the earth core, and these corrugations define upright ribs or projections, each of which lies between successive drill heads and drill spindles which prevents any rotary creeping of the earth plug during the drilling operation as well as during the elevation thereof.

Wash water is supplied from the hollow or tubular drill rod 22 to the bores of each of the tubular drill spindles 27 by means of a vertical tube or pipe 96, the lower end of which passes downwardly through the partition 41 and into the upper end of the adjacent tubular spindle 27, while the upper portion passes upwardly through the partition 40 and into an upright passage 97 in the partition 39, the upper end of the passage communicating with an annular chamber 98 formed in the head or partition 39. A radial port 99 communicates between the annular chamber 98 and the bore 23 of the hollow drill rod 22. It will thus be seen that wash water may readily pass downwardly from the drill rod 22, the water chamber 98, the tube or pipe 96, into the bore of the drill spindle 27, from the bottom of which the wash water may escape through a passage 32, best shown in Figure 2a of the drawings, so as to function in the usual manner of wash water. It will here be explained, reference being had to Figure 2a of the drawings, that the cuttings or borings may be washed upwardly through the opening 36 in the partition 25 and into the closed chamber defined by the partitions 25 and 37 and the casing B. It will of course be understood that there are no operating parts in the chamber thus defined except the drill spindles, and therefore the washing of cuttings and borings into the chamber will not interfere with the proper operation of the apparatus.

The mechanism for indicating the dip and strike of the core in its position at the bottom of the hole in the earth or the dip and strike of the hole at any elevation thereof has been shown in Figures 11 to 21 inclusive. This mechanism includes a frame made up of a head 100, a base 101 and a centrally disposed tube 102 having its ends screw threaded into centrally disposed openings in the head and base respectively. The head and the base are circular in shape and of a diameter to fit easily within the cylindrical casing C which is open at its bottom and is interiorly screw threaded so as to fit the screw threaded exterior of the cross-head 20 at the top of the casing B, as well shown in Figures 2 and 12. The top of the casing C is closed by a circular head 103 screw threaded to or otherwise connected with the casing C. Within the tube 102 there is another tube 104 having its lower end connected to the cross-head 20, as by being screw threaded into a screw threaded socket in the part 20. The upper end of the tube 104 passes upwardly through the head 103 and the latter is provided with a suitable gland or stuffing box 105. It will be understood that the drill rod 22 passes downwardly through the tube 104 in which the drill rod of course has a working fit. The purpose of the tube 104 and the gland or stuffing box 105 is to prevent the ingress of any water which may be in the hole in the earth above the casing C. Moreover any water which might rise and pass upwardly between the drill rod 22 and the cross-head 20 will be prevented, by the gland, from passing back into the interior of the casing C.

The means for indicating the dip, i. e. the angle to the horizontal which the device assumes during the production of the plug or at any other elevation of the hole in the earth, includes a plurality of upright parallel tubes 106 which are transparent so that the level of the mobile liquid 107 contained therein may be readily seen. As illustrated in Figure 13, four such tubes have been shown, but a larger number may be employed. It is believed that four tubes disposed equidistant around the circular head 100 and base 101 will give the best results, and better results might be obtained by a larger number of tubes as will hereinafter appear. Each tube is supported at its lower end upon a post 108 rising from the base 101, and at its top by a post 109 depending from the head 100. The lower post 108 is tubular or provided with a bore 110 which communicates at its lower end with a horizontal passage 111 provided in the base 101, the inner end of said passage having a branch 112 extending upwardly through a plug 113 screw threaded into a screw threaded opening in the base 101 and rising slightly above the top of the latter. The arrangement of the four passages 111 extending from the several tubular posts 108 is best shown in Figure 14 of the drawings, and each of these passages may be a copper or other flexible tube fitted into grooves in the under side of the base 101 and through vertical openings in the plug 113. The upper end of each branch 112 projects slightly above the top of the plug 113 so as to constitute a valve seat for a valve 114 contained within a chamber defined by a cylindrical casing 115 whose lower end is open and fitted to the upper projecting end of the screw threaded plug 113. Normally the valve 114 is held in an elevated position, as will be hereinafter described, so that the tops of the branches 112 are open and in communication with the valve chamber, whereby the several water tubes 106 are in mutual communication, and when the entire device is tilted from its vertical position, the mobile liquid will readily pass from one or more of the tubes to one or more of the other tubes in order that the liquid may seek its level, which is made use of in indicating the dip as will be hereinafter explained. Mounted on the top of the casing 115 is another casing 116, and on top of the casing 116 is another casing 117 which defines a chamber for a purpose as will be hereinafter described. The valve 114 has an upstanding valve stem 118 which projects through the top of the casing 116 into the casing 117 and is provided at its top with a head 119. A soluble member 120 is disposed around the upper portion of the valve stem 118 and is interposed between the top of the casing 116 and the head 119 so as to normally hold the valve 114 in its elevated position. A helical spring 121 is located in the casing 116, surrounds the valve stem and bears at its upper end against the underside of the top of the casing 116 and at its lower end upon the top of a head or shoulder 122 provided upon the valve stem 118 and intended for the purpose of lowering the valve 114 when the soluble prop 120 has been dissolved, thereby to close the open tops of the branch tubes 112 so as to cut off the mutual communication between the several water tubes 106 and retain in each of the latter the water that is contained therein when the device has been tilted from its vertical position or in any position thereof. Disposed upon the top of the casing 117 is a chamber or casing 123 containing a liquid 124 which is a solvent for the soluble prop 120. Within the upper portion of the chamber or casing 117 there is a valve 125 which normally closes the port or passage 126 connecting the chambers 117 and 123 and through which the valve stem 127 passes. This valve stem extends upwardly through the top of the chamber 123 and is provided with a head or shoulder 128. There is a helical spring 129 surrounding the valve stem and bearing upon the top of the chamber 123 and against the under side of the head or shoulder 128 so as to hold the valve 125 at its upper limit with the port or passage 126 closed. The valve stem 127 extends upwardly through an opening 130 in the head 100 and through a packing gland in the head 103 and is provided on its top with a head or enlargement 131 which, as well indicated in Figure 1 of the drawings, is in the path of a trip head or projection 132 carried by the drill rod 22, whereby the valve stem 127 may be pushed downwardly so as to lower the valve 125 and permit the escape of the solvent 124 into the chamber 117 so as to attack the soluble prop 120 and thereby permit of the lowering of the valve 114 to close the valve seats or ports constituted by the branch tubes 112 so as to cut off the mutual communication between the several water tubes 106.

From the foregoing description and by reference to Figures 19, 20 and 21, which are diagrammatic views of the dip indicating mechanism, it will be understood that D designates the tops of the water columns in diametrically opposite water tubes 106 when the apparatus is in a vertical position. In Figure 20 the apparatus has been tilted, and now the tops of the water columns are indicated at D' as will be readily understood, when it is remembered that the water columns are in mutual communication. By closing the valve 114, the water in each of the tubes 106 will be trapped therein, so that when the apparatus is again brought to a vertical position, as shown in Figure 21, the tops of the water columns will be as indicated at $D^2$ and $D^3$, for the reason that in the tilted position of the device, as shown in Figure 20, liquid will run from the right-hand tube 106 to the left-hand tube 106, thus lowering the top of the liquid column in one tube and elevating it in the other tube. In other words there will be less water in one tube than in the other tube, so that when the valve 114 is closed, and the device is brought to its upright position as in Figure 2, the top D³ of one water column will lie below the top D² of the water column in the other tube. A line drawn through the tops D² and D³ of the water columns as shown in Figure 21 will indicate the angle to the horizontal or to the vertical in which the apparatus was disposed at the time of the cutting of the plug in the bottom of the hole or at any elevation in the hole where an observation is to be made. Also the apparatus may be tilted, from the vertical, until the tops of the water columns D² and D³ come into horizontal alignment, as in Figure 20, which then will be the position of the apparatus in which it was originally disposed, and then the angle of the longitudinal axis of the device with respect to the horizontal or to the vertical will be the angular disposition of the core in its original position or the angular disposition of any predetermined portion of the hole in the earth. It will now be understood that if only two water columns were employed, they would of course indicate the angular position when the tilting is in the plane common to the two water columns, but two water columns only would not be effective where the tilting is in a plane other than that common to the tubes, wherefore a plurality of water columns is necessary to properly and adequately indicate the inclination or dip. The simplest arrangement is that shown in Figures 13 and 14 and includes four water columns or tubes arranged in pairs with the members of each pair disposed diametrically opposite one another, and the several water columns disposed equidistant in a circle.

For the purpose of indicating the strike, i. e. the magnetic compass relation of the plug of earth produced by the apparatus or a portion of the hole in the earth at any predetermined elevation thereof, there is employed compass mechanism as well shown in Figures 11, 12, 13, 16 and 17. Two compass mechanisms have been shown so that one may be checked against the other, and therefore a description of one of them is deemed sufficient. Each strike mechanism includes an upright tube 133 which may be transparent or otherwise, a transparent tube being preferable as it permits more convenient observation of the compass. The tube 133 is open at its lower end and supported upon a post 138 rising from the base 101. The top of the tube is closed by a suitable cover 139 from which rises a tubular externally screw threaded stem 140 which is fitted to a screw threaded opening in the head 100. The tube 133 contains a mobile liquid 141 upon which floats a compass, preferably comprising a float body 142 in the form of a ring and a magnetic needle 143 which passes diametrically through the body with its north and south poles projecting externally of the body and reduced to a pointed configuration as well shown in Figures 13 and 16. At least one end of the compass of the magnetic needle is appropriately marked so that the north and south poles may be readily distinguished. The magnetic needle is guided in its movement longitudinally within the tube so as to prevent the ends of the needle hanging upon the walls of the tube, by means of a wire 144 or a rod of very small diameter which is received through the ring body 143 and through an opening 145 at the middle of the magnetic needle. The upper end of the wire 144 passes upwardly through an opening in the cover 139 and is provided at its upper end with a clamp 146 which is clamped upon the wire and rests upon the top of the stem 140 or the top of the head 100 as may be desired. The lower end of the wire is suitably secured to a base member 147 resting upon the top of the post 138, suitably secured thereto as by fastenings 148, and spaced from the top of the post by suitable spacing elements 149, as for instance washers through which the fastenings 148 pass, whereby there is a clearance between the bottom of the base 147 and the top of the post 138 for the purpose as will be hereinafter described. Rising from the base 147 is a circular series of prongs 150 disposed concentric with the rod or wire 144. Each prong is in the nature of a fine flexible wire with its upper end pointed or tapered, as shown in Figure 17 of the drawings, so that when the compass needle is lowered, the pointed ends thereof may sink between a pair of adjacent prongs, the tapered upper ends of which facilitate the introduction of the ends of the needle between adjacent prongs, and the prongs being flexible or elastically yieldable so that the needle points may pass downwardly in frictional engagement with adjacent prongs without interference thereby. When the compass needle has descended until it rests upon the base 147, in the position shown in Figure 17 of the drawings, it will be understood that the compass needle will be definitely and effectually held in this position by the frictional engagement of the two pairs of prongs with the reduced ends of the needle, and that the needle will remain in this position and be held from turning on its vertical axis while the apparatus is being lifted out of the hole in the earth, and thus the needle will be maintained in its original set position with respect to the core of earth material produced by the apparatus and elevated to the earth's surface.

To provide for the withdrawal or escape of the mobile liquid from the tube 133 the top of the post 138 is provided with an inverted conical chamber 151 having an open top communicating with the space beneath the base 147, which chamber is of course normally full of the liquid, the compass floating upon the top of the liquid in the tube 133. From the bottom of the chamber 151, a tube or passage 152 leads outward through the post and through a relatively large opening 153 in the adjacent side wall of the part 116 where it is provided with a downwardly extending branch 154 which extends downwardly through the top of the chamber 115 and projects below the latter so as to form a port or valve seat in cooperation with the upper side of the valve 114, said valve being normally closed against the port or valve seat so as to retain the liquid within the tube 133. When the valve 114 is lowered by reason of the dissolving of the soluble prop 120, the liquid in the tube 133 will be permitted to drain through the passage 152 into the chamber 115, from which it may escape upwardly, as best shown in Figures 15 and 18 through a vent or waste tube 155 which extends through the top of the chamber 115. The liquid escaping from the waste tube 155 passes into the chamber 116 and thence outwardly through the openings 153 in the walls of the chamber 116 and into the space around the tube 133 and within the casing C. All of the water will of course drain from the tube 133, thus permitting the compass needle to gradually descend until it comes to rest on the base member 147, in the position shown in Figure 17, where it will be held in its settled position by the gripping action of the prongs 150. As hereinbefore described, the tube 104, which is preferably screw threaded at its lower end into the partition 20, and is provided at its upper end with a gland 105, excludes the ingress of water from the hole in the earth into the casing C. This exclusion of water from the casing C is important in that should there be any water in the casing C it might interfere with the proper draining of the water 141 from the compass tube 133, and therefore it will be understood that it is important to have the casing C hermetically sealed against ingress of water from the hole in the earth.

In the use and operation of the apparatus of the present invention, the parts are assembled upon the drill rod 22 in the relation shown in Figure 1 of the drawings, the dip and strike indicating mechanism contained within the casing C being disposed above the casing B within which is contained the drill carriage on which is mounted the drill spindles 27 and 28 and the parts for driving the same from the drill rod 22. For producing a core of earth material from the bottom of the hole A previously provided in the earth, the apparatus is lowered until the bottom of the casing B comes to rest upon the bottom of the hole. When so positioned, the parts of the drilling mechanism will be in the relative positions shown in Figures 1, 2 and 2a, the drill carriage 38 being at its upper limit with its bottom 43 in the position shown in Figure 1 and at a predetermined distance above the notch or opening 92 in the wall of the casing B. The head or projection 132 will be at a predetermined distance above the top of the casing C. The clutch 52 will be in its operative position, and the clutch 80 will be in its inoperative position. Rotary motion will be transmitted from the rotating drill rod 22 through the clutch 52 to the lower drill rod section 22', and from the latter rotary motion will be transmitted to the drill spindles 27 by means of the driving gear 56 and the gears 57 on said drill spindles. Rotary motion will be transmitted to the drill spindles 28 from the driving gear 54 to the gears 55 on the drill spindles 28. As clearly indicated in Figures 1 and 2a it will be seen that the drill spindles 28 project below the drill spindles 27, and it will be explained that they maintain this relative position throughout the operation of the apparatus. As the drill spindles 27 and 28 are rotated, their drill heads 29 and 30 will bore downwardly thorugh the bottom of the hole A, the drill carriage 38 and all of the parts mounted thereon travelling downwardly through the stationary casing B which is held against rotary creeping in any suitable manner, as by means of the teeth 24 on the bottom of the casing sinking into the earth at the bottom of the hole. The drill carriage 38 and the parts mounted thereon will continue to travel downwardly until the heel 89 of the bell crank 85 comes opposite and snaps into the notch or opening 92 in the stationary casing B, whereupon further downward movement of the drill carriage will be stopped, but the rotation of the drill spindles and the drill heads or bits 29 and 30 will continue because the clutch 52 continues in its operative position. When the arm 84 of the bell crank 85 has been lowered, due to the movement of its heel 89 into the notch or opening 92, the rod 83 and the clutch member 80 will be lowered into the groove or seat 82 in the top of the loosely mounted gear 79, whereupon the gear 78, which has been held fixed upon the rod 71 by the frangible pin 77, will be retarded in its rotary movement, due to the fact that the gear 79 has one less tooth than the gear 78, whereby the frangible pin 77 will be broken so as to permit the retarding of the rotary movement of the gear 78 and the nut 76. As the drill spindle 28 continues to rotate at its original speed, the difference in rate of rotation between the rod 71 and the nut 76 will cause the rod to slide downwardly, carrying the plunger 93 at its lower end downwardly through the pump barrel 94 so as to force the oil or other mobile material downwardly and through the passage 95 into the chamber 34 so as to gradually feed the undercutter 35 outwardly through one side of the drill bit 30. It will here be explained that, as well shown in Figure 8, each of the four drill spindles 28 is provided with a plunger 93 carried by a rod 71, so that each of the four undercutters 35 will be gradually fed outward to undercut the core or plug of earth material produced by the sinking of the drill bits 29 and 30 into the bottom of the hole A in the earth. The rotation of the several drill spindles continues until the collar 67, best shown in Figure 2 of the drawings, passes below the bottom of the bell crank 65, whereupon the lower fork end 66 of the bell crank will be released from the collar 67 and then the tubular stem or sleeve 61 will be forced downwardly by the spring 69 resulting in the lowering of the clutch member 53 into the deep seat 50 in the clutch member 49, thereby disconnecting the drill rod sections 22 and 22' so as to stop further rotation of the drill spindles. In order that the drill spindles 28 may cease rotation with their undercutters 35 in the position shown in Figure 8 and underlying the bottom of the core or plug of earth material produced by the operation of the drills, the seat 51 is located in the cross-head 40 in the proper predetermined angular position such that when the projecting end 53 of the shiftable clutch member 52 seats itself in the seat 51, the rotation of the drill spindles will be stopped with the undercutters 35 in the position shown in Figure 8. By reference to Figure 6 it will be understood that when the shiftable clutch member 52 is lowered, its projecting end 53 will as a rule engage the top face of the partition 40 on which it will travel in a circular path until it comes into a position above and in alignment with the seat 51, when it will drop into the seat, disconnect the drill rod sections 22 and 22', and finally engage one end of the seat 51 and thus cease its rotary movement, and thereby stop the rotary movements of the drill spindles in the positions necessary to have the undercutters 35 underlying the plug or core of earth material produced by the drilling operation. As hereinbefore described, the plug or core of earth material produced by the drills is corrugated longitudinally and the ribs thus formed on the plug or core lie between successive drill spindles and thus prevent rotary creeping of the plug when the latter is drawn to the earth's surface by the withdrawal of the apparatus. Moreover the ribbed condition of the exterior of the core or plug, during its formation, prevents rotary displacement thereof should it break away at its bottom during the drilling operation.

It will here be explained that the notch or opening 92, shown in Figure 1 of the drawings, is disposed at a predetermined distance below the bottom 43 of the drill carriage corresponding to the desired length of the plug or core of earth material to be produced by the apparatus. The drill spindles 27 and 28 of course extend well below the bottom 43 of the drill carriage and reach substantially to the bottom of the casing B, so that the sinking of the drill bits into the earth is stopped at the desired position by reason of the heel of the bell crank 85 snapping into the notch or opening 92 in the casing B. Thereafter, there is no downward feeding of the drill carriage 38 and the drill spindles, but the spindles continue to rotate so as to effect the undercutting of the core.

The operation of the dip and strike mechanism is as follows. The trip head or projection 132 on the drill rod 22 is spaced above the dip and strike mechanism a distance such that the trip member 132 will come into contact with the top of the trip rod 127 and push the latter downwardly just prior to the beginning of the undercutting operation. The depression of the trip rod or valve stem 127 will lower the valve 125 and open the passage or port 126 so that the liquid solvent 124 may pass downwardly into the chamber 117 and attack the soluble support 120 which eventually becomes dissolved, thus permitting the spring 121 to depress the valve 114, thereby opening the ports 154 and closing the ports 112. By the opening of the ports 154, the mobile liquid 141 will drain from each of the compass tubes 133 whereby the compasses will sink to the bottoms of the tubes and come to rest on the respective bases 147 with the ends of the needles lying between and held by two pairs of prongs 150 in the position well shown in Figure 17. The compass needles will thus be locked in their true magnetic positions and will remain thus locked while the apparatus is being withdrawn from the hole in the earth, whereby the compass directions of the various strata of the plug or core of earth material may be observed and noted. While one compass mechanism may be employed, it is preferred to employ two compass mechanisms, so that each may be checked against the other and thus an accurate strike observation and record may be made.

By the closing of the ports 112, the liquid connection between the several water columns 107 is closed, thereby trapping in each column the amount of water contained therein in whatever position the apparatus may be inclined to the horizontal, as hereinbefore described and as indicated in Figure 20 of the drawings. Upon the withdrawal of the apparatus from the hole in the earth, and with the dip and strike mechanism in a vertical position, as indicated diametrically in Figure 21 of the drawings, the top of the water columns will of course be at different elevations, such for instance as indicated at D² and D³, from which the inclination of the apparatus during the formation of the plug or core may be determined by the angular disposition of a line connecting the tops D² and D³ of opposite water columns, or by tilting the apparatus until the tops D² and D³ of the water columns come to the same level which will position the apparatus in the angular position in which it was during the formation of the core or plug.

In order to conveniently observe each compass and the water columns, the casing C must be unscrewed from the cross-head 20 and removed from the apparatus, whereupon the transparent character of the tubes 106 and 133 will permit convenient observation and examination of these parts. Should the tube 133 be non-transparent, the clamp 146 may be released, the cover 139 backed off from the top of the tube 133, and then the tube 133 removed from the post 138, whereupon the compass may be viewed in its position between prongs or wires 150.

I claim:
1. Apparatus of the character described, comprising a drill rod, an annular series of core forming drills, each drill being mounted for rotation about its longitudinal axis and actuated by the drill rod, and dip and strike indicating means in fixed relation to the series of drills.

2. Apparatus of the character described, comprising dip and strike indicating means, and rotary core forming means for producing a ribbed earth core with the ribs thereof cooperating with the core forming means to maintain the original position of the core with respect to the dip and strike indicating means.

3. Apparatus of the character described, comprising a drill rod, an annular series of core forming drills actuated by the drill rod, undercutting means actuated by the drills, and dip and strike indicating means in fixed relation to the series of drills.

4. Apparatus of the character described, comprising a drill rod, an annular series of core forming drills actuated by the drill rod, dip and strike indicating means fixed with respect to the series of drills, control means for the indicating means, and trip means actuated by the drill rod for setting the control means in operation.

5. Apparatus of the character described, comprising a casing open at its bottom, a rotatable and endwise slidable drill rod extending through the top of the casing, a drill carriage slidable within the casing and connected to and movable with the drill rod, an annular series of rotatable core forming drills mounted on the carriage for projection through the open bottom of the casing, driving means between the drill rod and the drills, dip and strike indicating means in the casing and above the drill carriage and fixed with respect to the annular series of drills, control means for the dip and strike indicating means, and trip means actuated by the downward movement of the drill rod for setting the control means in operation.

6. Apparatus of the character described, comprising a drill rod, an annular series of core forming drills actuated by the drill rod, dip and strike indicating means in fixed relation to the series of drills, means actuated by the drill rod for controlling the dip and strike indicating means, normally inactive undercutting means, means for limiting the downward movement of the drills, and means actuated by the drill rod for feeding the undercutting means into operative position.

7. Apparatus of the character described, comprising a casing open at its bottom, a rotatable and endwise slidable drill rod extending through the top of the casing, a drill carriage slidable within the casing and connected to and operable with the drill rod, means to permit limited downward sliding movement of the drill carriage, an annular series of rotatable core forming drills mounted on the carriage for projection through the open bottom of the casing, some of the drills being below the other drills and provided with normally inactive undercutters, driving means between the drill rod and the drills, means actuated by the drill rod for feeding the undercutters into operative position when the drill carriage has reached its lower limit, driving means between the drill rod and the drills, dip and strike indicating means in the casing and above the drill carriage and fixed with respect to the annular series of drills, control means for the dip and strike indicating means, and trip means actuated by the downward movement of the drill rod for setting the control means in operation.

8. Apparatus of the character described, comprising core forming means, a drill rod for actuating the core forming means, dip indicating means including a plurality of interconnected mobile fluid columns, strike indicating means including a magnetic needle floating on a column of mobile fluid, control means actuated by the drill rod for closing the communication between the liquid columns of the dip indicating means and for draining the fluid from beneath the magnetic needle, and means for holding the magnetic needle against turning on its axis in its lowered position.

9. Apparatus of the character described, comprising core forming means, a drill rod for actuating the core forming means, dip indicating means including a plurality of interconnected mobile fluid columns disposed in an annular series concentric with the drill rod, strike indicating means including a mobile fluid column provided at its bottom with an annular series of upstanding closely arranged prongs having their upper ends free, a magnetic needle floating upon the said column, a valve common to the fluid column of the strike indicating means and the intercommunication of the fluid columns of the dip indicating means, trip means for said valve, and a trip operating striker carried by the drill rod.

10. Apparatus of the character described, comprising core forming means, a drill rod for actuating the core forming means, dip indicating means including a plurality of interconnected mobile fluid columns, strike indicating means including a magnetic needle floating on a column of mobile fluid, control means actuated by the drill rod for closing the communication between the liquid columns of the dip indicating means and for draining the fluid from beneath the magnetic needle, means for holding the magnetic needle against turning on its axis in its lowered position, and means for guiding the needle into cooperation with the needle holding means.

11. Apparatus of the character described, comprising core forming means, a drill rod for actuating the core forming means, dip indicating means including a plurality of interconnected mobile fluid columns disposed in an annular series concentric with the drill rod, strike indicating means including a mobile fluid column provided at its bottom with an annular series of upstanding closely arranged prongs having their upper ends free, a magnetic needle floating upon the said column, an upright needle-guide disposed concentrically with respect to the series of prongs, a valve common to the fluid column of the strike indicating means and the intercommunication of the fluid columns of the dip indicating means, trip means for said valve, and a trip operating striker carried by the drill rod.

12. A dip and strike indicating apparatus comprising a plurality of interconnected dip indicating mobile fluid columns arranged in an annular series, strike indicating means including a mobile liquid column, a magnetic compass floating upon the column, draining means for the column, means to hold the compass needle against turning on its axis in its lowered position, and means for actuation by a drill rod to open the draining means and to close the interconnection between the dip indicating columns.

13. A dip indicating apparatus comprising a frame including a head and a base and a drill-rod-receiving tube extending through the head and base of the frame, a plurality of tubes disposed in an annular series within the frame, intercommunicating conduits between the tubes, a mobile fluid in the tubes and in the conduits, a normally open valve for closing the conduit connections of the tubes, and trip means for releasing the valve and disposed for actuation by a part on a drill rod.

14. A strike indicating apparatus comprising a frame including a head and a base and a drill-rod-receiving tube extending through the head and base of the frame, an upright tube mounted within the frame, a mobile liquid within the tube, an annular series of upstanding prongs within the bottom portion of the tube, a magnetic needle floating within the tube and capable of settling between adjacent prongs and be held thereby in a lowered position of the magnetic needle, a drain for the tube, a normally closed valve for said drain, and means for actuation by a drill rod for opening the valve and draining the tube.

15. A core forming apparatus including a plurality of drills arranged in an annular series and disposed in close mutal relation, alternate drills extending below the other drills, and undercutters carried by said alternate drills.

16. Apparatus for forming and surveying earth cores, comprising a casing having means to engage a wall of an earth bore outside of the core being formed and prevent rotary creeping of the casing within the bore, dip and strike indicating means on the casing, and core forming means within the casing.

17. Apparatus for forming and surveying earth cores, comprising a casing having means to engage the bottom wall of an earth bore outside of the core being formed and prevent rotary creeping of the casing within the bore, dip and strike indicating means carried by the casing, and rotary core forming means mounted within the casing.

18. In an apparatus for forming and surveying earth cores, dip and strike indicating means, and core forming means including a plurality of drills arranged in close mutual relation in an annular series and mounted for rotation about their respective longitudinal axes for producing a corrugated earth core with the ribs thereof cooperating with the drills to maintain the original position of the core with respect to the dip and strike indicating means.

19. Apparatus for forming and surveying earth cores, comprising dip and strike indicating means, and rotary core forming means for producing a longitudinally corrugated earth core with the rib portions of the core between the corrugations cooperating with the core forming means to maintain the original position of the core with respect to the dip and strike indicating means.

JOHN R. McCURDY.